(12) United States Patent
Beusen

(10) Patent No.: US 6,548,181 B2
(45) Date of Patent: Apr. 15, 2003

(54) FLEXIBLE POLYAMIDE COMPOSITION

(75) Inventor: Guido P. C. Beusen, Schimmert (NL)

(73) Assignee: DSM N.V., Heerlen (NL)

( * ) Notice: Subject to any disclaimer, the term of this patent is extended or adjusted under 35 U.S.C. 154(b) by 214 days.

(21) Appl. No.: 09/962,146

(22) Filed: Sep. 26, 2001

(65) Prior Publication Data

US 2002/0128385 A1 Sep. 12, 2002

Related U.S. Application Data

(63) Continuation of application No. 09/338,490, filed as application No. PCT/NL97/00270 on Dec. 22, 1997.

(30) Foreign Application Priority Data

Dec. 23, 1996 (BE) .............................................. 9601075

(51) Int. Cl.⁷ ............................................. C08L 77/00
(52) U.S. Cl. ................ 428/474.7; 428/474.9; 524/504; 524/514; 525/66; 525/179
(58) Field of Search .................. 525/66, 179; 524/504, 524/514; 428/474.7, 474.9

(56) References Cited

U.S. PATENT DOCUMENTS 5,420,206 A * 5/1995 Mason et al. ................ 525/179

* cited by examiner

*Primary Examiner*—Ana Woodward
(74) *Attorney, Agent, or Firm*—Pillsbury Winthrop, LLP

(57) ABSTRACT

The invention relates to a flexible polyamide composition containing at least 50 parts by weight of non-cross-linked rubber per 50 parts by weight of polyamide and the production thereof. The polyamide has a molecular weight such that the melt viscosity at the processing temperature is at most 300 pa.s, preferably at most 200 pa.s. The rubber's Mooney viscosity is at least 40, most preferable is a rubber with a Mooney viscosity of at least 60. The rubber has been functionalized. Preferably a combination of a functionalized and a non-functionalized rubber is used. The rubber particles in the polyamide matrix have a particle size of at most 5 $\mu$m, preferably at most 3 $\mu$m.

21 Claims, No Drawings

FLEXIBLE POLYAMIDE COMPOSITION

This is a Continuation of application Ser. No. 09/338,490 filed Jun. 23, 1999, which is a continuation under section 120 of International Application No. PCT/NL97/00270 filed Dec. 22, 1997 which designated the U.S.

The invention relates to a process for the production of a flexible polyamide composition containing at least 50 parts by weight of non-crosslinked rubber per 50 parts by weight of polyamide. Such a composition is known from U.S. Pat. No. 5,003,003. U.S. Pat. No. 5,003,003 describes that compositions containing at least 50 parts by weight of rubber per 50 parts by weight of polyamide only have good mechanical properties if the rubber is crosslinked during the mixing in the melt of the polyamide and rubber phases; the rubber is then also said to be 'dynamically vulcanized'. If the rubber is not crosslinked during the mixing in the melt, the composition's tensile strength, among other things, will be many times lower. Especially in the case of polyamides with relatively high melting points, that is, higher than approx. 220° C., the process of dynamic vulcanization is particularly difficult to realize without the employed crosslinking agents, generally phenolic resins, damaging the polyamide, and the vulcanization process is difficult to control. The rubber/polyamide compositions obtained via dynamic vulcanization are for these reasons generally discoloured and cannot be used in colours other than black.

The object of the invention is hence a process for the production of a flexible polyamide composition containing at least 50 parts by weight of non-crosslinked rubber per 50 parts by weight of polyamide, which has good mechanical properties and is not, or not appreciably, discoloured.

The inventors have achieved this object with a process in which

A. 30–50 parts by weight of at least one polyamide and
B. 70–50 parts by weight of a rubber composition containing at least one functionalized rubber, are mixed with one another in the melt phase, in which A+B=100 parts by weight, characterized in that the polyamide has a molecular weight such that the melt viscosity of the polyamide, measured at low shear at the temperature at which the polyamide and the rubber are mixed in the melt, is lower than about 300 Pa.s and the rubber composition's Mooney viscosity ML (1+4) 125° C., measured according to ISO 289-1985-(E), is at least 40. Preferably the polyamide's melt viscosity is lower than 200 Pa.s, even more preferably 100 Pa.s, and the rubber's Mooney viscosity is at least 50, even more preferably at least 55. Most preferably the rubber composition has a Mooney viscosity of at least 60. The inventors have found that when the polyamide's molecular weight is chosen to be low enough, and the Mooney viscosity high enough, a good dispersion of the rubber in the polyamide matrix is most surprisingly obtained. In the case of the production of a polyamide/rubber composition the polyamide of which has a low melting point, a rubber with a relatively low Mooney viscosity, above the indicated minimum value, will generally suffice. In the case of compositions containing a polyamide with a high melting point the rubber will have to have a higher Mooney viscosity. Likewise, if, in the case of a polyamide with a low melting point, the rubber has a sufficiently high Mooney viscosity, a higher molecular weight will usually suffice than in the case of a polyamide with a high melting point. Instead of the Mooney viscosity also the melt viscosity of the rubber at the temperature of melt mixing at high shear may be chosen as a parameter. However these data are not available for most materials. Anyhow under the conditions of melt mixing the melt viscosity of the rubber composition should be appreciably higher than the melt viscosity of the polyamide.

By carrying out systematic experiments, an average person skilled in the art will be able to find the right combinations of the polyamide's molecular weight and the rubber's Mooney viscosity within the indicated molecular weight and Mooney viscosity ranges for the combination of polyamide and rubber desired in his case.

The usual equipment can be used for the mixing in the melt, for example a Brabender mixer, a Haake or Busch kneader or an extruder, for example a single- or double-screw extruder. Preferably a double-screw extruder, excerting high shear, is used. To prevent the risk of the polyamide suffering thermal damage, the process is preferably carried out in an inert gas atmosphere.

Rubber composition B preferably contains a combination of at least one functionalized rubber and a non-functionalized rubber. As used herein rubber means a low modulus flexible polymer with a glass transition below 0° C., preferably below −25° C. Examples of polymers falling under this definition are copolymers of ethylene and α-olefins, for instance propylene and butylene. Also the new group of plastomers, copolymers of for instance ethylene and 1-octene, obtainable by polymerisation in the presence of a metallocene catalyst are usefull as a component of composition B. 'Functionalized rubber' is understood to be a rubber containing groups that can react with polyamide. Such functionalized rubbers are known. A very large number is for example described in U.S. Pat. No. 4,174,358, as are the methods for preparing these functionalized rubbers. Various functionalized rubbers are commercially available under different names. Very suitable are rubbers that have been chemically modified through reaction with maleic anhydride or graft-copolymerisates of the rubber and an unsaturated dicarboxylic acid anhydride or dicarboxylic acids and/or esters, for example maleic anhydride, itaconic acid and itaconic anhydride, fumaric acid and maleic acid or a glycidyl acrylate, for example glycidyl methacrylate. In such a case the polyamide preferably contains sufficient amino end groups that can react with the functional groups. As the molecular weight of the polyamides that can be used in the process according to the invention is relatively low, the number of available amino end groups is generally high enough.

In principle, any non-crosslinked rubber that meets the Mooney viscosity requirements is suitable for use in the process according to the invention. 'Non-crosslinked rubber' is understood to be a rubber that is substantially non-crosslinked and shows no typical elastic behaviour. In the practice of mixing in the melt at high temperatures some crosslinking can generally not be prevented. Preferably the gel content is less than 50%, more preferably less than 30%, even more preferably less than 10%. The gel content is here defined as the fraction of the rubber that is insoluble in the solvent suitable for the rubber in question. For an EPDM rubber a suitable solvent is for instance xylene.

As B, use is preferably made of a combination of an ethylene-α-olefin copolymer, for example an ethylene-propylene copolymer, EPM, rubber and an ethylene-α-olefin terpolymer whose third monomer is a non-conjugated diene, for example a norbornene, for example ethyl norbornene, or hexadiene, for example-ethylene-propylene-norbornene terpolymer, EPDM rubber. In this case both the EPM and the EPDM may be functionalized. Preferably a combination of a non-functionalized EPDM rubber and a functionalized EPM rubber is used. In the case of polyamide 6 the functionalized EPM rubber has preferably been functionalized with maleic anhydride (MAh). Known EPDM rubbers are for example commercially available under the trade names Keltan from DSM NV, Nordel from E.I. du Pont de Nemours and Company, and Royalene from UniRoyal.

MAh-functionalized EPM rubbers are for example Exxelor VA 1801® made by Exxon and Tafmer MP 0610® of Mitsui.

The MAh content of the functionalized rubber may vary within a wide range, for example between 0.1 and 10 wt. %, preferably between 0.1 and 5 wt. %, more preferably between 0.1 and 2 wt. %. The weight ratio of the functionalized and non-functionalized rubbers may vary within a wide range, for example between 1:10 and 10:1; preferably the ratio is chosen to be lower than 1, for example between 0.9 and 0.1.

Very surprisingly compositions with superior properties are those in which at least one of the components of the rubber composition B is a styrene butadiene based block copolymer or functionalized styrene-butadiene block copolymer. This kind of elastomeric block copolymers is for instance commercialized under the tradename Kraton by Shell.

The flexible polyamide composition, obtainable with the process according to the invention, comprises
A: 30–50 parts by weight of at least one polyamide
B: 70–50 parts by weight of at least one non-crosslinked rubber, with A+B=100 parts by weight, and is characterized in that the rubber phase is dispersed as discrete particles in the polyamide as a continuous phase. The particle size of the dispersed rubber is generally smaller than 5 $\mu$m, preferably smaller than 3 $\mu$m. Preferably 90% of the number of rubber particles is smaller than 1 $\mu$m. The presence of A as a continuous phase does not exclude the possibility of a minor amount of A, for example up to 10% of A, being incorporated in B as small particles.

Preferably the flexible polyamide composition contains a rubber composition B consisting of
  b1: at least one non-functionalized rubber and
  b2: at least one functionalized rubber.
In such a case the dispersed rubber particles preferably have a nucleus consisting of the non-functionalized rubber and a shell consisting of the functionalized rubber.

The flexible polyamide composition according to the invention differs from the known polyamide compositions containing at least 50 wt. % non-crosslinked rubber such as those for example disclosed in U.S. Pat. No. 5,003,003 in that it is significantly more resistant to oil. For example, for an A:B=4:6 composition the increase in volume after 7 days' contact with ASTM 3 oil at 100° C. is even less than 10%, while for a similar composition according to the state of the art the increase is more than 100% after only 3 days' contact with oil (see example 6B of U.S. Pat. No. 5,003,003). This significantly better resistance to oil is a simple confirmation of the fact that the rubber particles are contained in a polyamide matrix.

Preferably the flexible polyamide composition according to the invention contains polyamide in a minor fraction for instance A being at most 45 pbw even more preferably at most 40 pbw, thereby imparting a higher flexibility without significant loss of oil resistance.

In the process for the production of a flexible polyamide composition according to the invention it may be advantageous to use a plasticizer for the polyamide phase. This will make it possible to use polyamides with a higher molecular weight than without the plasticizer. With this process a lower shore hardness is moreover obtained for the compositions. Examples of plasticizers for the polyamide phase are nonyl phenol and butyl benzenesulphonamide. The plasticizer is generally used in an amount of between 1 and 15 parts by weight, preferably 2–10, per 100 parts by weight of polyamide.

In a different case it may be advantageous, for example in order to improve the tensile strength, to subject the composition to after-condensation, preferably in the solid phase, after the mixing in the melt. Such a process can however not be used without limitations because there is a risk of phase inversion or separation into two cocontinuous phases during the processing of the composition by means of for example injection-moulding.

The composition according to the invention may furthermore contain the additives commonly used for polyamides, for example stabilizers, flame retardants, processing aids such as release agents and colourants or pigments. For specific applications the composition may optionally contain reinforcing fibres, for example glass fibres. The rubber phase may contain the additives commonly used for rubber and may for example be diluted with oil to a limited extent.

The composition according to the invention can preferably be used in processing methods involving low shear forces, for example in the extrusion of tubes, hoses, cable sheaths, in blow-moulding processes, fibre spinning and injection moulding.

The composition of the invention presents a particular advantage for application in the production of polyamide inlet manifolds for internal combustion engines, in which a flexible zone can be incorporated in a sequential blow-extrusion process, which facilitates the installation of the manifold. The strength of the welds between the glass-fibre-reinforced stiff parts and the flexible part is of good quality because in all the parts the continuous phase is polyamide.

The composition of the invention presents a further advantage in applications in which a hard polyamide core is to be coated with a soft flexible layer, also called a 'soft-touch' layer. Such an application is to be found for example in tool handles and tool casings. This multi-layer structure with very good adhesion between the two layers can be obtained through coextrusion or sequential injection moulding.

The good resistance to oil of the composition according to this invention presents additional, and often essential, advantages in applications such as those mentioned above.

The invention will now be further elucidated with reference to the following examples and comparative experiments. It will be clear to the average person skilled in the art that when specific rubbers are used in the examples, these may be replaced by rubbers having the same properties as far as functional groups and Mooney viscosity are concerned, and the polyamide 6 in the examples may likewise be replaced by any other polyamide that meets the requirements imposed with respect to the melt viscosity at the processing temperature. The recipe, e.g. the type of functional groups to be used, may then have to be adjusted in order to avoid undesired side-reactions in the case of, for example, polyamides derived from dicarboxylic acids and diamines.

THE EXPERIMENTS

Materials

Akulon K120®: Nylon 6, intrinsic viscosity 2.0 (in formic acid) from DSM, the Netherlands.
Akulon K122®: Nylon 6, intrinsic viscosity 2.2 (in formic acid) from DSM, the Netherlands Akulon K136®: Nylon 6, intrinsic viscosity 3.6 (in formic acid) from DSM, the Netherlands Keltan 778®: EPDM rubber from DSM, the Netherlands, Mooney viscosity ML (1+4) 125°=66. Composition 68/25, 7/6.3, Tg≈−50° C.

Keltan 5508®: EPDM rubber from DSM, the Netherlands, Mooney viscosity ML (1+4), 125°=54.6. Increased ethylene content 72.7/23.2/4.2, Tg=≈−50° C.

Exxelor VA-1801®: EP rubber modified with maleic anhydride,(0.65 wt. %,) from Exxon, Mooney viscosity= 61, Tg≈−50° C. MFR=9.

Royaltuf 485®: EP(DM) rubber, maleic anhydride content about 0.5 wt. %, E/P ratio 75/25. From UniRoyal.

Kraton FG 1901X®: Styrene-ethylene/butylene-styrene block copolymer, SEBS, having a styrene content of 28 wt. % and a maleic anhydride content of about 2.0 wt. % of Shell.

Sample Preparation

The compositions were obtained by means of:

a) mixing in the melt in a Haake Reocord mixer. The composition components were mixed at a set temperature of 240° C. for 8 minutes. The composition was subsequently removed from the mixer and cooled by means of cold pressing;

b) mixing in a ZSK 30-mm double-screw extruder (L/D= 42). A temperature profile increasing from 150 to 260° C. was used. The throughput was 5 kg/hour at a speed of 200 revolutions per minute. The polyamide and the functionalized rubber were mixed with one another beforehand and were fed to the extruder's throat using one K-tron. Ground non-functionalized rubber, Keltan 778, was also dosed to the extruder's throat, using a separate K-tron. This procedure was necessary because Keltan 778 had not been supplied as a granulate.

Injection-moulding of Specimen Rods and Plates

The compositions obtained in the manner described above were injection-moulded under conditions usually applied for nylon 6, using an Arburg 5 injection-moulding machine, after they had been dried in a vacuum oven for 24 hours at 80° C.

Oil Resistance

The samples' oil resistance was measured as weight change in % after 7 days immersion in ASTM #3 oil at 100° C. (experiments 01–09) or ASTM #1 oil (experiments 10–18).

Mechanical Properties

The following were determined of dried samples:

1. hardness according to DIN53505: Shore D (or A);
2. tensile test: tensile modulus, tensile strength and elongation at break, according to ASTM D638;
3. impact resistance, notched, at 23° C., 0° C. and −40° C. according to ASTM D256.

Table 1 presents a survey of the experiments carried out with different compositions and their results.

One of the conclusions that can be drawn from these results is that a relatively small difference in relative viscosity, $\eta_{rel}$=2.0→2.2, between compositions 1 and 7 already causes phase inversion. Also exp. 01 vs. exp. 03 shows the necessity of the presence of the functionalized rubber.

| | Ex. I | Ex. II | Comp. Ex. A | Ex. III | Ex. IV | Comp. Ex. B | Comp. Ex. C | Ex. V | Ex. VI |
|---|---|---|---|---|---|---|---|---|---|
| Sample composition | 01 | 02 | 03 | 05 | 06 | 07 | 08 | 09 | 10 |
| Akulon K120 | 40 | 40 | 40 | 40 | 40 | | | 40 | 30 |
| Akulon K122 | | | | | | 40 | | | |
| Akulon K136 | | | | | | | 40 | | |
| Keltan 778 | 40 | | 60 | | 40 | 40 | 40 | 40 | 47 |
| Keltan 5508 | | 40 | | | | | | | |
| Exxelor VA 1801 | 20 | 20 | | 60 | 20 | 20 | 20 | | |
| Royaltuf 485 | | | | | | | | 20 | |
| Kraton FG 1901X | | | | | | | | | 23 |
| Mixing Apparatus | | | | | | | | | |
| Haake kneader | | | + | | + | | | | |
| Extruder | + | + | | + | | + | + | + | + |
| Matrix material | polyamide | polyamide | rubber | polyamide | polyamide | rubber | rubber | polyamide | polyamide |
| Hardness | 54 | 52 | 39 | | 50 | 41 | 39 | 59 | |
| Tensile modulus (MPa) | 530 | 530 | 290 | | 435 | 430 | 505 | 500 | 490 |
| Tensile strength (MPa) | 19.8 | 23 | — | | 19.7 | 23.5 | 22.6 | 21.0 | 18.6 |
| Elongation at break (%) | 275 | 300 | — | | 350 | 290 | 105 | 205 | 370 |
| Notched impact resistance, −40° C. (kJ/m²) | n.b.*) | n.b. | 4 | | n.b. | n.b. | n.b. | n.b. | n.b. |
| Rubber particle size (μm) | 0.5–2.5 | — | — | 0.5–4 | 0.5–3 | — | — | 1.0—7 | |
| resistance to oil (vol. %) | 5 | 9 | 94 | 18 | 15 | | | 26 | |

*) n.b. = no break

The gel content of the rubber in composition 02 was determined as the insoluble fraction in n-decane. The polyamide particles present in the rubber particles were also determined as the insoluble fraction. Nevertheless, a 'gel content' of 9% only was found. Sample 10 shows that even a composition in which the polyamide:rubber ratio is 3:7 can be obtained in which the polyamide forms the continuous phase and non-crosslinked rubber is dispersed therein. Taking account of the differences in densities a volume ratio of even as high as 25:75 is realized.

EXAMPLE VII

With the composition 01 (Example 1) a bellow for a constant velocity joint was blow moulded on a Bekum BAE1 blow moulding machine. The bellow showed excellent mechanical properties and oil resistance.

EXAMPLE VIII

With the composition 01 a flexible tube was extruded on a conventional extrusion machine. A tube having a perfect surface and oil resistance was obtained.

EXAMPLE IX–XV (samples 11–17)

In a further series of experiments the influence of the ratio of functionalized to non-functionalized rubber was varied. The results and compositions are given in Table 2.

From the data in the Table it is clear that Kraton FG-1901 X is more effective to obtain a good dispersion than Exxelor VA 1801.

TABLE 2

Sample compositions and properties of dry polyamide/rubber blends

| Example | I | IX | X | XI | XII | XIII | XIV | XV | XVI |
|---|---|---|---|---|---|---|---|---|---|
| Sample | 01 | 11 | 12 | 13 | 14 | 15 | 16 | 17 | 10 |
| Sample composition (wt. %) | | | | | | | | | |
| Polyamide 6, Akulon K 120 | 40 | 40 | 40 | 40 | 40 | 40 | 40 | 40 | 30 |
| Keltan 778 | 40 | 45 | 50 | 55 | 40 | 45 | 50 | 55 | 47 |
| Exxelor VA 1801 | 20 | 15 | 10 | 5 | | | | | |
| Kraton FG-1901X | | | | | 20 | 15 | 10 | 5 | 23 |
| Mechanical properties (dry) | | | | | | | | | |
| Tensile test | | | | | | | | | |
| Tensile modulus (MPa) | 570 | 610 | 570 | 510 | 650 | 705 | 640 | 640 | 490 |
| Tensile stress at break (MPa) | 19.8 | 19.4 | 17.5 | 15.3 | 25.7 | 11. | 20.7 | 19.3 | 18.6 |
| Elongation at break (%) | 240 | 210 | 115 | 25 | 215 | 280 | 270 | 215 | 370 |
| Notched Izod | | | | | | | | | |
| −40° C. (kJ/m²) | ST. | ST. | B/T | B | ST. | ST. | ST. | ST. | ST. |
| −20° C. (kJ/M²) | | | 57 | B | | | | | |
| +23° C. (kJ/m²) | | | | 10 | | | | | |
| Oil resistance (weight change %) ASTM #1, 7 days 100° C. | 3 | 5 | 9 | 27 | 2 | 2 | 3 | 3 | 22 |

ST: Super Tough, samples do not break at all
B/T: Brittle/Tough transition
B: Brittle

What is claimed is:

1. A process for preparing a flexible polyamide composition comprising:
   mixing in the melt phase at parts by weight relative to the total weight of components A+B,
   A) 30–50 parts by weight of at least one polyamide and
   B) 70–50 parts by weight of a rubber composition comprising:
      (b1) at least one non-functionalized rubber and
      (b2) at least one rubber containing groups that can react with polyamide,
   wherein the Mooney viscosity of said rubber composition is at least 40, and the polyamide forms a continuous phase.
2. The process according to claim 1,
   wherein the polyamide has a molecular weight such that the melt viscosity is lower than 200 Pa.s.
3. The process according to claim 2,
   wherein the melt viscosity is lower than 100 Pa.s.
4. The process according to claim 1,
   wherein the Mooney viscosity of the rubber composition is at least 50.
5. The process according to claim 2,
   wherein the mixing in the melt is carried out in an extruder.
6. The process according to claim 1,
   wherein rubber composition B is a combination of at least one functionalized and at least one non-functionalized rubber.
7. The process according to claim 6,
   wherein the functionalized rubber has been functionalized with acid groups.
8. The process according to claim 6,
   wherein the rubber includes at least one ethylene-α-olefin copolymer and/or ethylene-α-olefin terpolymer.
9. The process according to claim 6,
   wherein the functionalized rubber includes at least one ethylene-propylene copolymer modified with maleic acid and/or a styrene-butadiene block copolymer functionalized with maleic acid anhydride.
10. The process according to claim 6,
    wherein the weight ratio of the functionalized and non functionalized rubbers is between 10 and 0.1.
11. The process according to claim 10,
    wherein the weight ratio is between 0.9 and 0.1.
12. The process according to claim 1,
    wherein the polyamide has a molecular weight such that the melt viscosity, measured at low shear, at the temperature at which the polyamide and the rubber are mixed in the melt, is lower than 300 Pa.s.
13. The process according to claim 1,
    wherein the amount of said at least one polyamide is 30–45 parts by weight.
14. A flexible polyamide composition comprising, relative to the total weight of components A+B:
    A) 30–50 parts by weight of at least one polyamide and
    B) 70–50 parts by weight of a rubber composition comprising:

(b1) at least one non-functionalized rubber, and
(b2) at least one rubber containing groups that can react with polyamide,
wherein the Mooney viscosity of said rubber composition is at least 40, and the rubber composition is dispersed as discrete particles in a continuous polyamide phase.

15. The flexible polyamide composition according to claim 14,
wherein the average particle size of the dispersed rubber is smaller than 5 µm.

16. The flexible polyamide composition according to claim 15,
wherein the dispersed rubber particles (b1) constitute the nucleus and (b2) surrounds it as a shell.

17. The flexible polyamide composition according to claim 14,
wherein the polyamide contains a plasticizer.

18. The flexible polyamide composition according to claim 14,
wherein the composition is subjected to solid-phase after-condensation.

19. The flexible polyamide composition according to claim 14, wherein the amount of said at least one polyamide is 30–45 parts by weight.

20. A molded article comprising the composition according to claim 14.

21. A molded article according to claim 20 obtained through sequential extrusion or coextrusion of the polyamide composition with glass-fiber-reinforced polyamide.

* * * * *